(12) United States Patent
Carrier et al.

(10) Patent No.: US 11,587,347 B2
(45) Date of Patent: Feb. 21, 2023

(54) PRE-PROCESSING A TABLE IN A DOCUMENT FOR NATURAL LANGUAGE PROCESSING

(71) Applicant: INTERNATIONAL BUSINESS MACHINES CORPORATION, Armonk, NY (US)

(72) Inventors: Scott Carrier, New Hill, NC (US); Ritwik Ray, Apex, NC (US); Jonathan Chapin Rand, Ann Arbor, MI (US); Jothilakshmi Sirangimoorthy, Canton, MI (US); Hui Wang, Ann Arbor, MI (US); Robert Fredenburg, Kalamazoo, MI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 17/155,077

(22) Filed: Jan. 21, 2021

(65) Prior Publication Data

US 2022/0230012 A1 Jul. 21, 2022

(51) Int. Cl.
*G06F 17/00* (2019.01)
*G06V 30/412* (2022.01)
(Continued)

(52) U.S. Cl.
CPC .......... *G06V 30/412* (2022.01); *G06F 3/0482* (2013.01); *G06F 40/237* (2020.01); *G06F 40/40* (2020.01); *G06V 30/416* (2022.01)

(58) Field of Classification Search
CPC ................ G06V 30/412; G06V 30/416; G06F 3/0482; G06F 40/30; G06F 40/237; G06F 40/40
See application file for complete search history.

(56) References Cited

U.S. PATENT DOCUMENTS 8,903,711 B2 12/2014 Lundberg et al.
9,201,853 B2 * 12/2015 Green .................. G06F 40/205
(Continued)

OTHER PUBLICATIONS

U.S. Appl. No. 16/785,374, filed Feb. 7, 2020, entitled "Navigating Unstructured Documents Using Structured Documents Including Information Extracted From Unstructured Documents".
(Continued)

*Primary Examiner* — Laurie A Ries
(74) *Attorney, Agent, or Firm* — Konrad Raynes Davda & Victor LLP; David W. Victor

(57) ABSTRACT

Provided are a computer program product, system, and method for pre-processing a table in a document for natural language processing. A table in a document is parsed to extract column headers, row headers, and data cells, which are processed to determine an initial set of a main element comprising an entity whose value is to be extracted, a conditional element that refines the entity, and a value element comprising a value for the entity. A user selection is received of at least one of the column headers, row headers, and data cells for at least one of the main element, conditional element, and the value element in the initial set to produce a modified set of the main element, conditional element, and value element. The modified set is provided to a natural language processing engine to perform natural language processing of the document including the table, using the modified set.

20 Claims, 10 Drawing Sheets

(51) Int. Cl.
*G06F 3/0482* (2013.01)
*G06F 40/237* (2020.01)
*G06F 40/40* (2020.01)
*G06V 30/416* (2022.01)

(56) References Cited

U.S. PATENT DOCUMENTS

| | | |
|---|---|---|
| 9,286,290 B2 | 3/2016 | Allen et al. |
| 9,535,894 B2 | 1/2017 | Carrier et al. |
| 10,067,924 B2 | 9/2018 | Surprenant |
| 10,740,545 B2 | 8/2020 | Freed |
| 11,010,546 B2 * | 5/2021 | Guggilla ............... G06F 40/221 |
| 2004/0193520 A1 | 9/2004 | LaComb et al. |
| 2006/0004725 A1 * | 1/2006 | Abraido-Fandino ....................... G06F 16/951 |
| 2015/0347387 A1 * | 12/2015 | Feller ................... G06F 40/242 704/9 |
| 2016/0055376 A1 | 2/2016 | Koduru |
| 2017/0052950 A1 * | 2/2017 | Danielyan ............. G06F 40/284 |
| 2017/0286398 A1 * | 10/2017 | Hunt ....................... G06F 40/30 |
| 2018/0260389 A1 * | 9/2018 | Bahrami ................. G06F 40/30 |
| 2019/0171704 A1 * | 6/2019 | Buisson ................ G06F 40/131 |
| 2019/0340240 A1 | 11/2019 | Duta |
| 2020/0034481 A1 * | 1/2020 | Asplund ................ G06F 16/35 |
| 2020/0104350 A1 * | 4/2020 | Allen ..................... G06V 30/40 |
| 2020/0302114 A1 * | 9/2020 | Allen .................... G06F 40/169 |
| 2021/0240976 A1 * | 8/2021 | Tiyyagura ............ G06V 30/414 |
| 2021/0383070 A1 * | 12/2021 | Hunter ................. G06F 40/103 |

OTHER PUBLICATIONS

U.S. Appl. No. 16/785,329, filed Feb. 7, 2020, entitled "Extracting Information From Unstructured Documents Using Natural Language Processing and Conversion of Unstructured Documents Into Structured Documents".

Schilder, F., et al., "A Flexible Table Parsing Approach", Conference Paper in Polibits, 45, Mar. 2012, 8 pp.

* cited by examiner

Table Item Metadata

Element Classifications and Lexical Connectors

Display Screen Coordinate Mapping

DEDUCTIBLES, COINSURANCE, OUT-OF-POCKET LIMITS AND LIFETIME MAXIMUM BENEFIT — 700

| BENEFIT FEATURES — 702 | PAR PROVIDER BENEFIT — 704 | NON-PAR PROVIDER BENEFIT — 706 |
|---|---|---|
| Individual *Deductible* | $350 per *covered person* | $1,000 per *covered person* |
| Employee + Spouse or Same Sex Domestic Partner *Deductible* | $350 per *covered person*, no more than $700 per *employee + spouse or domestic partner* | $1,000 per *covered person*, no more than $2,000 per *employee + spouse or domestic partner* |
| Employee + Child(ren) *Deductible* | $350 per *covered person*, no more than $700 per *employee + child(ren)* | $1,000 per *covered person*, no more than $2,000 per *employee + child(ren)* |
| Family *Deductible* | $350 per *covered person*, no more than $1,050 per *covered family* | $1,000 per *covered person*, no more than $3,000 per *covered family* |
| *Coinsurance* | The Plan pays 85%, you pay 15% | The Plan pays 60%, you pay 40% |

FIG. 7

Flattened text

[what you will pay ▾] [for ▾] [If you visit a health care provider's office or clinic ▾] [is ▾] [Primary care visit: $30 copay/office visit ▾]  — 804b, 806b ▶ Preview ☐ Main  ☐ Conditional  ☐ Value    [+ Add Column]

— 818b — 820b

| Common Medical Event | Services You May Need | What You Will Pay | | Limitati |
|---|---|---|---|---|
| | | Network Provider (You will pay the least) | Non-Network Provider (You will pay the most) | |
| If you visit a health care provider's office or clinic | Primary care visit to treat an injury or illness | Primary care visit: $30 copay/office visit; deductible does not apply Telehealth or telemedicine services: $30 copay/office visit; deductible does not apply | Primary care visit: 50% coinsurance Telehealth or telemedicine services: 50% coinsurance | None |
| | Specialist visit | $55 copay/visit; deductible does not apply | 50% coinsurance | None |
| | Preventive care / screening / immunization | No charge; deductible does not apply | 50% coinsurance | You may preventiv needed plan will |

— 800b

Flattened text:
what you will pay for
If you visit a health
care provider's office
or clinic is Primary
care visit: $30
copay/office visit Detected Concepts:
• Office Visit
Copay ($30)

PRE-PROCESSING A TABLE IN A DOCUMENT FOR NATURAL LANGUAGE PROCESSING

BACKGROUND OF THE INVENTION

1. Field of the Invention

The present invention relates to a computer program product, system, and method for pre-processing a table in a document for natural language processing.

2. Description of the Related Art

A Natural Language Processing (NLP) program processes documents including tables, comprised of columns and rows of data cells, by performing a table flattening pre-process to extract information on the table for the NLP program to use to interpret the document and tables. Table flattening involves parsing the table to extract tokens comprising headers and sub-headers in the table associated with the data cells. Table flattening may involve table segmentation to segment text into rows, columns, and headers and then interpret the text.

The table flattening process may identify three types of elements, including a main element, which defines the primary entity whose value to be extracted, a conditional element, which refines the primary entity, and a value element, which contains the value for the entity. Concatenation rules may then be used to form natural language sentences based on the main, conditional and value elements. Information extracted during the table flattening process is then provided to the NLP program to interpret the document and tables embedded in the document.

There is a need in the art for improved techniques for pre-processing of tables in a document for the NLP program to process.

SUMMARY

Provided are a computer program product, system, and method for pre-processing a table in a document for natural language processing (NLP). A table in a document is parsed to extract column headers, row headers, and data cells. The column headers, row headers, and data cells are processed to determine an initial set of a main element comprising an entity whose value is to be extracted, a conditional element that refines the entity, and a value element comprising a value for the entity from the processed column headers, row headers, and data cells. User selection is received of at least one of the column headers, row headers, and data cells for at least one of the main element, conditional element, and the value element in the initial set to produce a modified set of the main element, conditional element, and value element. The modified set of the main element, conditional element, and the value element are provided to an NLP engine to perform natural language processing of the document including the table, using the modified set of the main element, conditional element, and the value element to interpret the table.

BRIEF DESCRIPTION OF THE DRAWINGS

FIG. 7 illustrates an example of classification of table items in a table.

FIGS. 8a, 8b, and 8c illustrate examples of a graphical user interface (GUI) in which a user may modify the classified elements of the table.

DETAILED DESCRIPTION

When performing natural language processing (NLP) of a document, the NLP program may provide a visualization of annotations output from the NLP processing layer. This visualizations allow users to evaluate the accuracy of detected concepts against the full context from which the concepts were detected in the document. However, one or more pre-processing layers preceding the NLP processing layer of the document can greatly impact the accuracy of the NLP layer output.

Described embodiments provide improved computer technology for NLP pre-processing operations including the table flattening process to provide users information and visualization of the pre-processing table flattening results to allow the user to inspect the results for accuracy and edit classifications of the table elements for subsequent improved processing and understanding by the NLP program. With described embodiments, a table interpreter may process column headers, row headers, and data cells in a table in a document to determine an initial set of a main element comprising an entity whose value is to be extracted, a conditional element that refines the entity, and a value element comprising a value for the entity from the processed column headers, row headers, and data cells. User selection may then be received of at least one of the column headers, row headers, and data cells for at least one of the main element, conditional element, and the value element in the initial set to produce a modified set of the main element, conditional element, and value element. The modified set of the main element, conditional element, and the value element is provided to an NLP engine to perform natural language processing of the document including the table, using the modified set of the main element, conditional element, and the value element to interpret the table.

Figure 1:
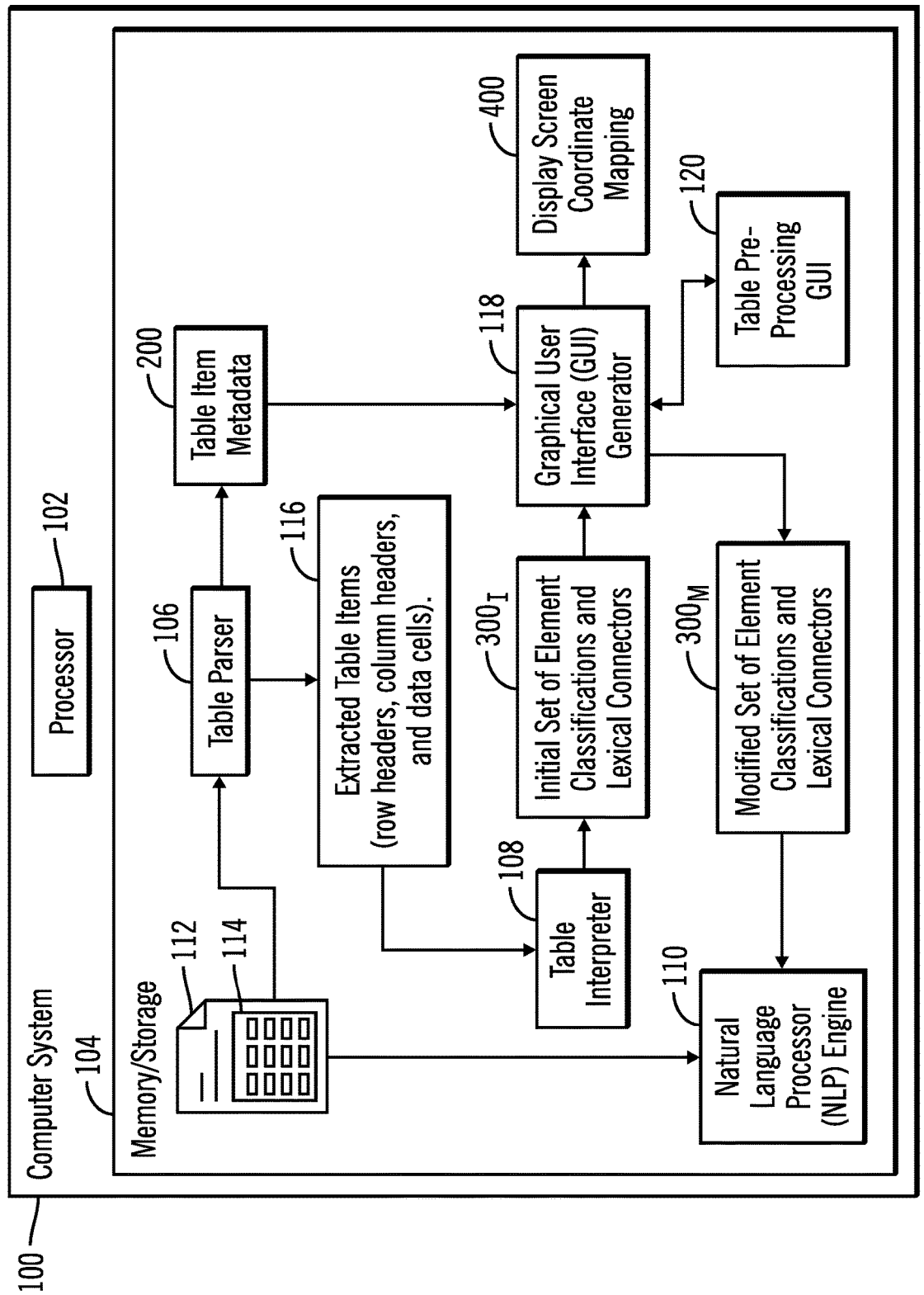
FIG. 1 illustrates an embodiment of a natural language computing system.

FIG. 1 illustrates an embodiment of a computer system 100 having a processor 102 to execute program components stored in a memory/storage 104. The memory/storage 104 includes program components executed by the processor 102, including a table parser 106 and a table interpreter 108 to perform table pre-processing flattening operations, and a natural language processor (NLP) engine 110. The table parser 106 parses a document 112 including one or more tables 114, having rows and columns of data, to produce extracted table items 116, including determined row headers, column headers, and data cells, and table item metadata 200 having metadata on the extracted row headers, column headers, and data cells. A table interpreter 108 receives the extracted table items 116 and classifies the table items as an initial set of element classifications $300_I$ including a main element, comprising the primary entity whose value is to be extracted as part of natural language understanding of the table, a conditional element, which refines or places a condition on the primary entity, a value element having the value for the primary entity, and lexical connector tokens to connect the elements in a concatenated natural language statement. The table interpreter 108 may use classification techniques known in the art, such as machine learning technology to classify table items as the main element, conditional element(s), and value element. Machine learning or concatenation rules may be used to determine the lexical connectors for the classified elements in the initial set $300_I$.

The initial set of element classifications $300_I$ and table item metadata 200 are provided to a graphical user interface (GUI) generator 118 to generate a table pre-processing GUI 120 to allow the user to modify the table cells initially determined to be the main element, conditional element, and value element used in interpreting the table to produce a modified set of element classifications and lexical connectors $300_M$. The table flattening GUI generator 118 further generates a display coordinate mapping 400 that maps coordinates of the table 114, rendered in the table pre-processing GUI 120 displayed on a user computer display, to coordinates of the table 114 in the document 112. A user, such as a subject matter expert, reviewing the initial classified table element classifications and lexical connectors $300_I$, may use the table pre-processing GUI 120 to change the table items comprising the table element classifications and lexical connectors to output a user modified set of element classifications and lexical connectors $300_M$ that are provided to the NLP engine 110. The NLP engine 110 performs natural language processing of the document 112 and tables 114 subject to table flattening preprocessing.

With the described embodiments, the table flattening preprocessing allows the user to review the initial set of machine determined element classifications and lexical connectors $300_I$ and determine whether the concatenation rules, classifications, and lexical connectors should be changed to improve the understanding of the meaning of the table 114 to optimize processing by the NLP engine 110.

The document 112 may comprise a structured document, such as a Microsoft® Word file, Portable Document Format ("PDF)", Extensible Markup Language (XML) document, a Hypertext Markup Language (HTML) document, as well as an unstructured document, etc. (Microsoft is a trademark of Microsoft Corporation throughout the world).

The memory/storage 104 may comprise a suitable volatile or non-volatile memory for storing programs to execute and information used by the processor 102 to execute.

Generally, program modules, such as the program components 106, 108, 110, 118 may comprise routines, programs, objects, components, logic, data structures, and so on that perform particular tasks or implement particular abstract data types. The program components and hardware devices of the computer system 100 of FIG. 1 may be implemented in one or more computer systems, where if they are implemented in multiple computer systems, then the computer systems may communicate over a network The programs 106, 108, 110, 118 may comprise program code loaded into memory and executed by a processor. Alternatively, some or all of the functions may be implemented in hardware devices, such as in Application Specific Integrated Circuits (ASICs) or executed by separate dedicated processors.

In one embodiment, the programs 106, 108, 110 may implement a machine learning technique such as decision tree learning, association rule learning, neural network, inductive programming logic, support vector machines, Bayesian network, etc., to perform their specific tasks in the natural language processing pipeline. The programs 106, 108, 110 may comprise artificial neural network programs. Each neural network may be trained using backward propagation to adjust weights and biases at nodes in a hidden layer to produce the computed output. In backward propagation used to train a neural network machine learning module, biases at nodes in the hidden layer are adjusted accordingly to produce the desired outcome based on specified confidence levels. Backward propagation may comprise an algorithm for supervised learning of artificial neural networks using gradient descent. Given an artificial neural network and an error function, the method may calculate the gradient of the error function with respect to the neural network's weights and biases.

In FIG. 1, arrows are shown between components in the memory/storage 104. These arrows represent information flow to and from the program components 106, 108, 110, 118 and do not represent data structures in the memory 104.

Figure 2:
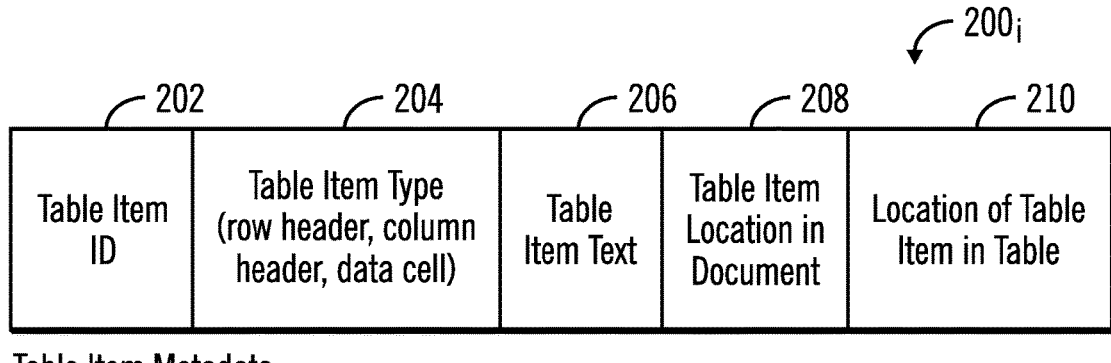
FIG. 2 illustrates an embodiment of table item metadata for table items in a table.

FIG. 2 illustrates an embodiment of table item metadata $200_i$ for one of the table items extracted from the table 114, and includes a table item identifier 202, comprising a unique identifier of the table item; a table item type 204, such as a row header, column header, or data cell; the table item text 206; a location 208 of the table item in the document 112, such as page number, horizontal and vertical offsets and coordinates within that page for the start and end of the table item 202, such as defining a boundary region from the top left corner of the extracted text to its bottom right corner; location 210 of table item in the table 114, such as row and column numbers within the table 114. Table item metadata $200_i$ may be generated for each cell in the table 114 being processed.

Figure 3:
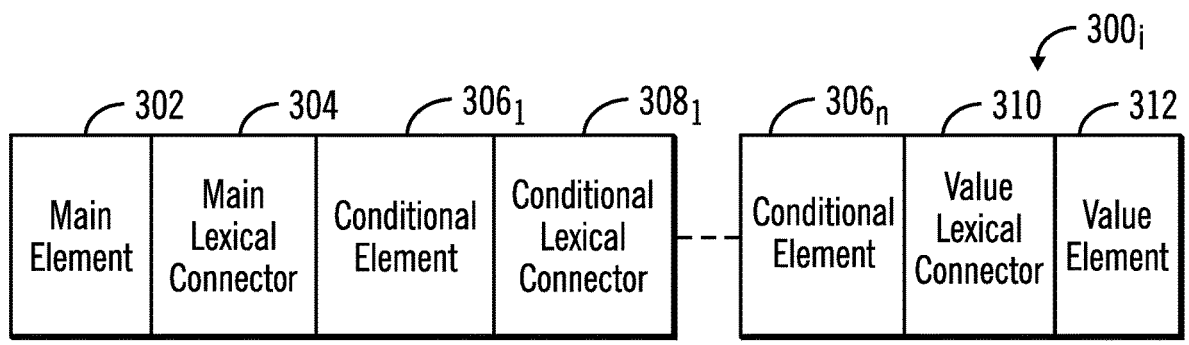
FIG. 3 illustrates an embodiment of element classifications and lexical connectors for a table.

FIG. 3 illustrates an embodiment of element classifications and lexical connectors $300_I$ which may comprise an initial set $300_I$ generated by the table interpreter 108 or a modified set $300_M$ selected by the user using the table pre-processing GUI 120, and includes: a main element 302, comprising the primary entity whose value is to be extracted as part of natural language understanding of the table; a main lexical connector 304 to provide a lexical token to connect the main element 302 to a conditional element $306_1$, which refines or places a condition on the main element 302. If there are multiple conditional elements $306_n$, i.e., n is greater than one, then there would be n−1 lexical connectors, one additional conditional lexical connector $308_j$ for each added conditional element $306_i$. There is a value lexical connector 310 to connect the final $306_n$ or only conditional element $306_1$ to the value element 312, which contains the value for the entity. If there is only one conditional element $306_1$, i.e., n=1, then there would be no conditional lexical connector and only a value lexical connector 310 between the sole conditional element $306_1$ and the value element 312.

Lexical connectors may comprise strings such as "for", "is", "and", etc.

The element classifications and lexical connectors provide $300_i$ a concatenation rule for combining main elements comprising values in a row or column for the main element and conditional element(s) comprising values in a row or column that results in the value element 312.

Figure 4:
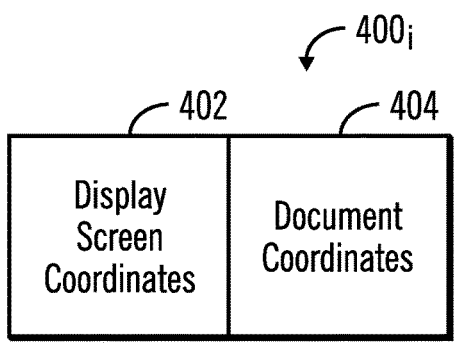
FIG. 4 illustrates an embodiment of an instance of a display screen coordinate mapping.

FIG. 4 illustrates an embodiment of an instance of a display screen coordinate mapping $400_i$ that maps display screen coordinates 402 showing the table 114 on the user display screen to the document coordinates 404 of the table 114 in the document.

Figure 5:
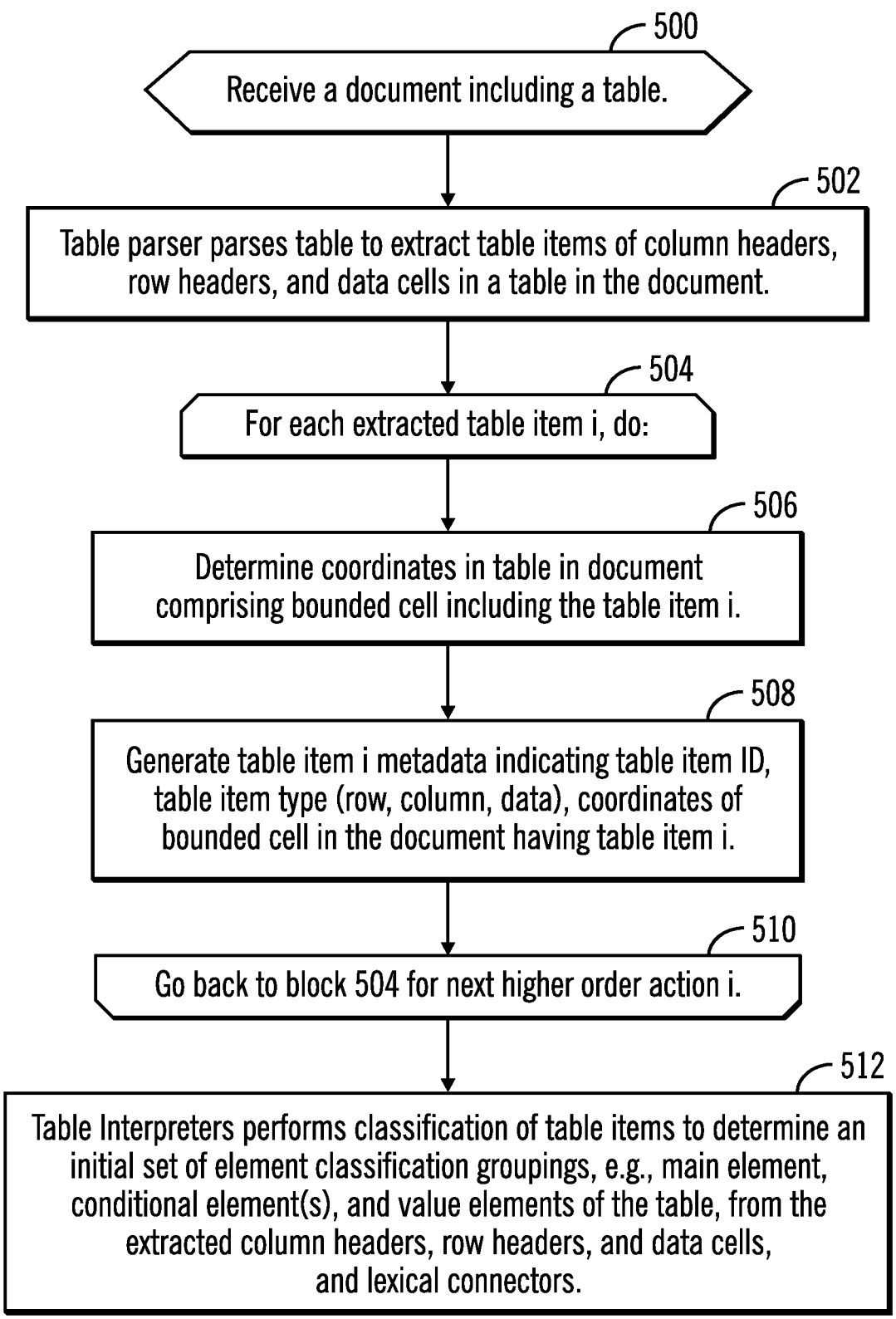
FIG. 5 illustrates an embodiment of operations to parse a table to classify elements in the table.

FIG. 5 illustrates an embodiment of operations performed by the table parser 106 to initiate the table flattening pre-processing of tables 114 in the document 112. Upon receiving (at block 500) a document 112 including a table 114, the parser 106 parses (at block 502) the table 114 to extract table items of column headers, row headers, and data cells in a table 114 in the document 112. For each extracted table item i, the parser 106 performs the operations at blocks 504 through 510. The parser 106 determines (at block 506) coordinates in the table 114 in the document 112 comprising the boundary region including the table item i. The coordinates may include the page number of the table item i within the document 112 as well as horizontal and vertical offsets and coordinates within that page for the start and end of the table item i. The horizontal and vertical offsets may define a boundary region or bounding box from the top left corner of the extracted table item i to its bottom right corner. The determined coordinates may also include information about the row and column coordinates of the table item i within the containing table 114. The parser 106 generates (at block 508) table item i metadata $200_i$ indicating table item ID 202, table item type 204 (row, column, data), table item 202 location in the document 208 (page and horizontal and vertical offsets in the page), and location 210 of table item 202 in the table 114, such as row and column location.

The table interpreter 108 processes (at block 512) the extracted table items 116, including table item metadata 200 for the table items, to determine an initial set $300_I$ of element classifications, e.g., main element 302, conditional element(s) $306_1 \ldots 306_n$, and value element 312 of the table 114, from the extracted column headers, row headers, and data cells, and lexical connectors 304, $308_1 \ldots 308_{n-1}$, 310 between the main element 302, conditional element(s) $306_1 \ldots 306_n$, and value element 312. The determined initial classifications and lexical connectors may then be saved in the initial set of element classifications and lexical connectors $300_I$.

With the embodiment of FIG. 5, the table flattening processes 106, 108 determines an initial set of element classifications and lexical connectors to form concatenation rules to construct natural language sentences describing the information in the cells of the table.

Figure 6:
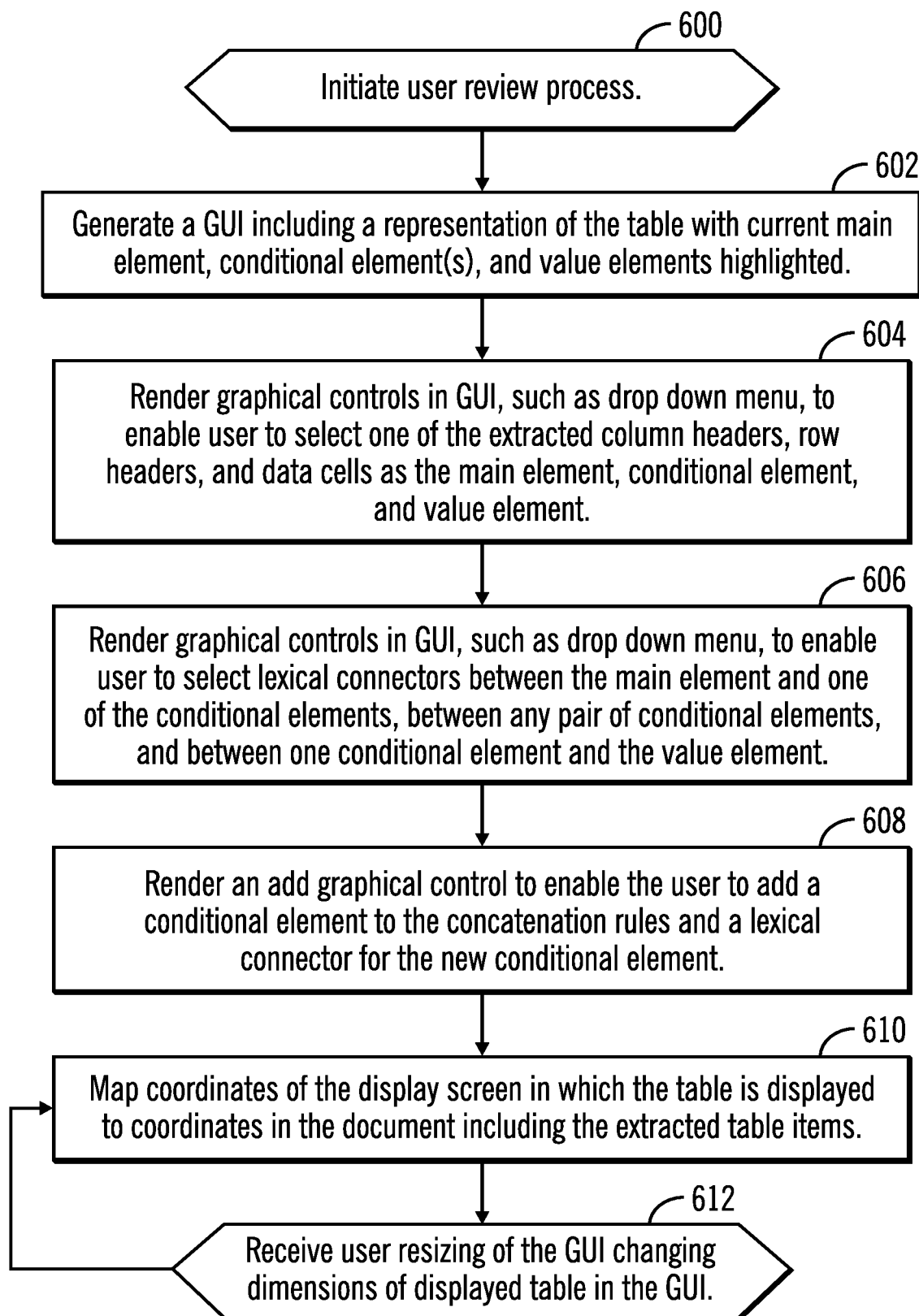
FIG. 6 illustrates an embodiment of operations to generate a graphical user interface (GUI) to enable a user to modify the classified elements for the table.

FIG. 6 illustrates an embodiment of operations performed by the GUI generator 118 to initiate the review process of the generated initial set $300_I$ of element classifications and concatenation rules to allow editing by a subject matter expert managing the pre-processing and optimization of the NLP engine 110. Upon initiating (at block 600) the process, the GUI generator 118 generates (at block 602) a table pre-processing GUI 120 including a representation of the table 114 with the initial main element, conditional element(s), and value elements highlighted. The GUI generator 118 renders (at block 604) graphical controls in the GUI 120, such as drop-down menus, to enable the user to select one of the extracted column headers, row headers, and data cells as the main element 302, conditional element(s) $306_1 \ldots 306_n$, and value element 312 different from what the table interpreter 108 determined. The GUI generator 118 renders (at block 606) graphical controls in the GUI 120, such as drop-down menus, to enable the user to select lexical connectors 304, $308_1 \ldots 308_{n-1}$, 310 between the main element 302 and one of the conditional elements $306_1$, between any pair of conditional elements, and between the last conditional element $306_n$ and the value element 312, respectively. The GUI generator 118 may further render (at block 608) an add graphical control to enable the user to add an additional conditional element $306_{n+1}$ to the concatenation rules and a lexical connector $308_n$, 310 for the new conditional element $306_{n+1}$.

The GUI generator 118 maps (at block 610) display screen coordinates 402 of the display screen in which the table 114 is displayed to document coordinates 404 in the document including the extracted table items to form display screen coordinate mappings $400_i$ to map the coordinates in which the table 114 is rendered on the display screen to coordinates of the table 114 in the document 112. Upon receiving (at block 612) a resizing of the GUI 120 rendered on the display screen changing the dimensions of the displayed table 114 in the GUI 120, control proceeds back to block 610 to remap the display screen coordinates 402 to document coordinates 404 based on the resizing.

The embodiment of FIG. 6 renders the table pre-processing GUI 120 to enable the subject matter expert to modify the initial set $300_I$ of element classifications and lexical connectors to improve the NLP engine 110 processing of the document 112 and table 114.

In generating the display screen to document 112 mappings, the GUI generator 118 translates the screen coordinates to document coordinates, e.g., PDF coordinates. The coordinate mapping may consider the location on-screen of the rendered page, the magnification in effect, the location of the user's click, etc. Straightforward geometrical calculations using these factors may be used to translate the screen coordinates to document 112, e.g., PDF coordinates, i.e., the page number and horizontal and vertical offsets within the document 112 of the coordinates.

FIG. 7 illustrates an example of a table 700, such as table 114, including rows and columns. Highlighted table item 702 comprises the main element 302, highlighted column header 704 comprises a conditional element 306, and highlighted data cell 706 comprises the value element by way of example.

Figure 8A:
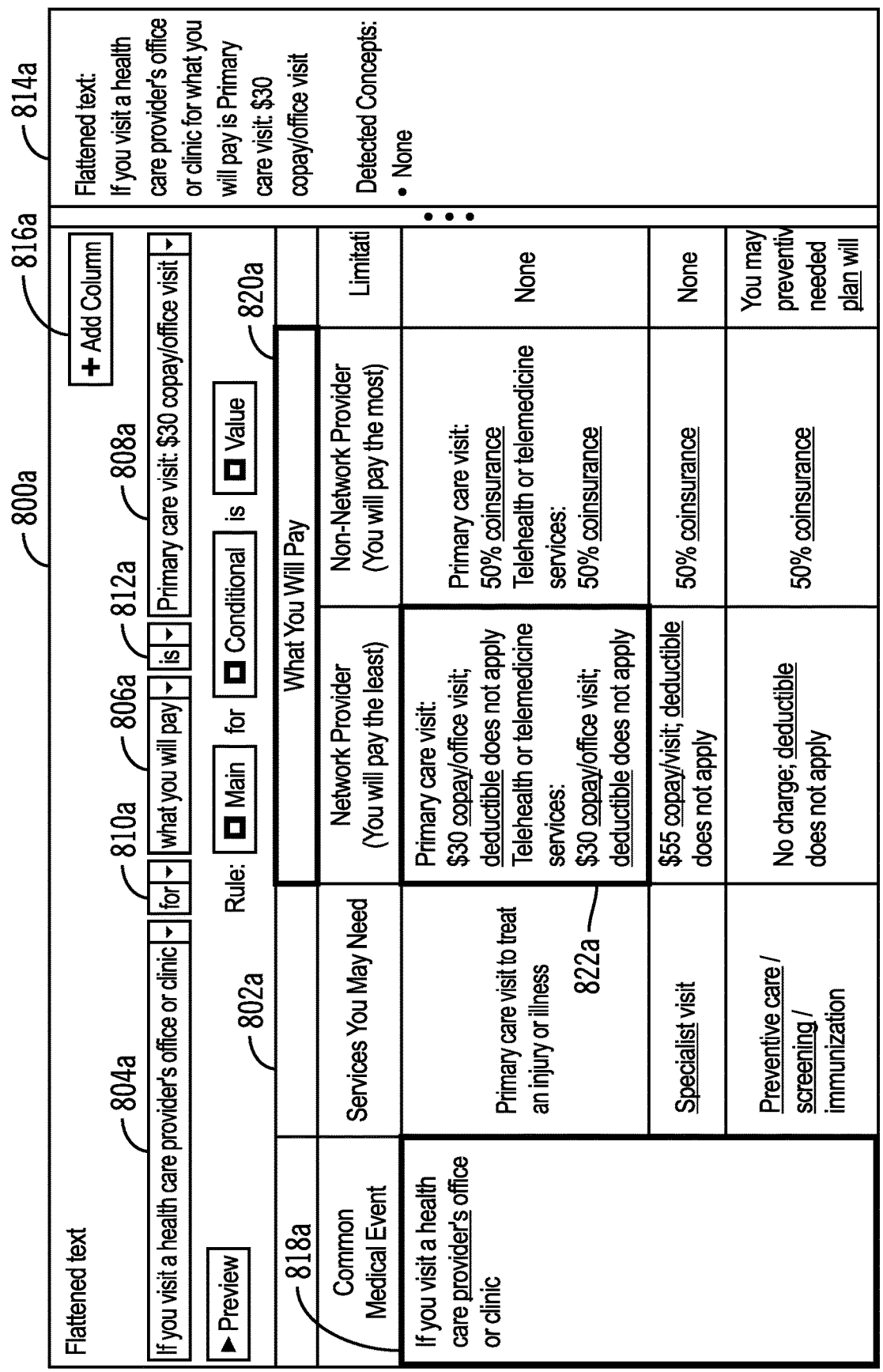

FIG. 8a illustrates an example of a table pre-processing GUI 800a, such as an embodiment of GUI 120, in which the table 802a is rendered with columns and headers. A main element drop-down menu 804a, a conditional element drop-down menu 806a, and value element drop-down menu 808a enables the user to select any of the table items as the main element 302, conditional element $306_1$ (only one is shown), and value element 312. Further, the lexical connector controls 810a, 812a enable the user to select a main lexical connector 304 and value lexical connector 310, respectively. The panel 814a shows the result of the selected concatenation rule selected in the drop-down menus 804a-812a. The drop-down menus 804a-812a may initially be set to the element classifications and lexical connectors in the initial set $300_I$ determined by the table interpreter 108. The add column graphical control 816a allows the user to add an additional condition element $306_i$ and conditional lexical connector $308_j$ to the concatenation rules. In FIG. 8a, table elements 818a, 820a, and 822a are set as the main element 302, sole conditional element $306_1$, and value element 312, respectively, and they are highlighted with a graphic to identify their element classification.

FIG. 8b illustrates the table pre-processing GUI 800b, such as an embodiment of GUI 120, after the user has modified the selection of the main element 804b and conditional element 806b presented in GUI 800b to be the table items 820b and 818b, respectively. This changed selection results in a new textual concatenation in panel 814b. This new selection modifies the main element 302 and conditional element $306_1$ in the settings $300_2$ to produce the modified set $300_M$ of element classifications.

Figure 8C:
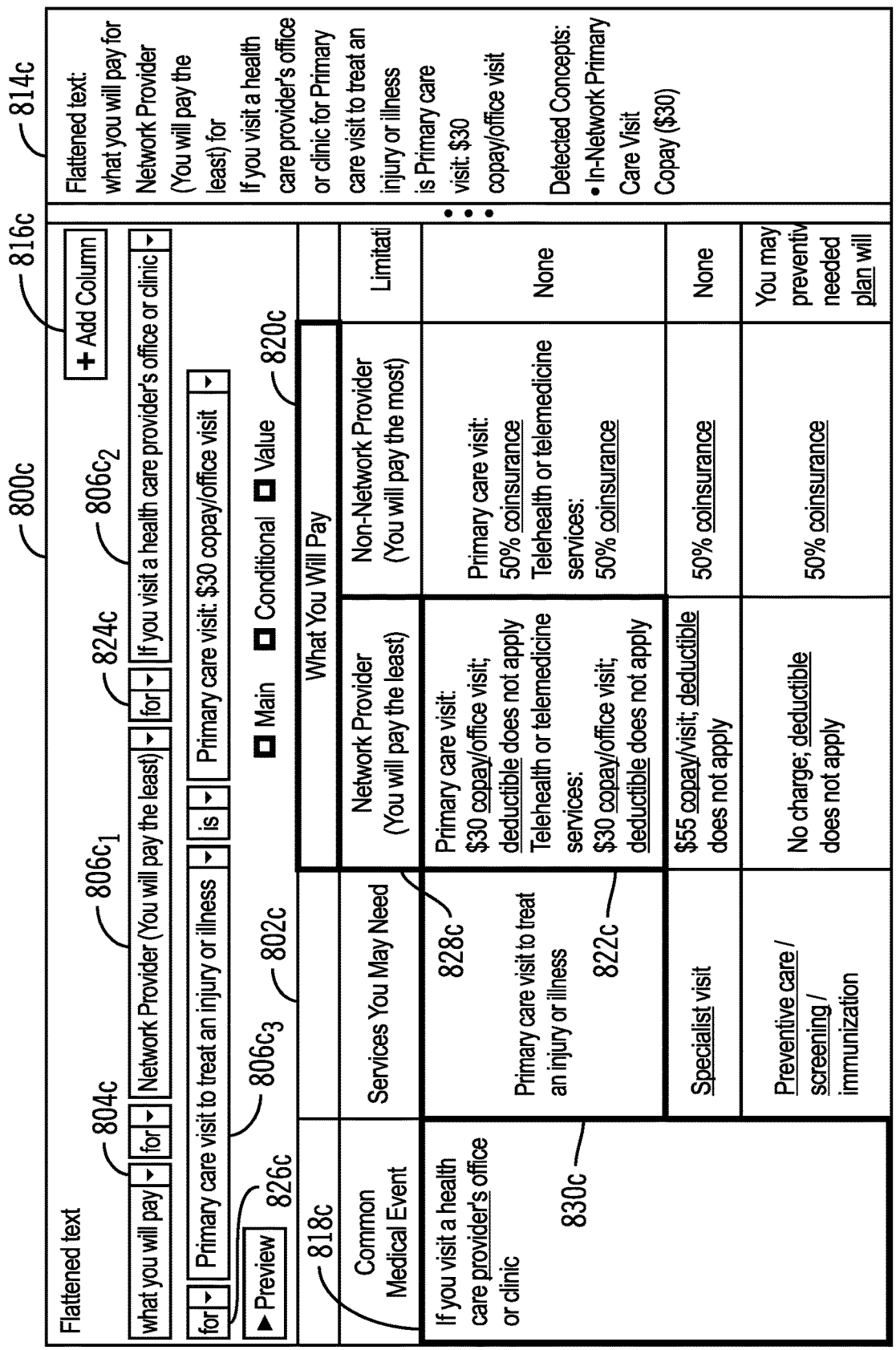

FIG. 8c illustrates the table pre-processing GUI 800a after the user has added two additional conditional element drop-down menus using the add column button 816c, resulting in three conditional element selection drop-down menus $806c_1$, $806c_2$, and $806c_3$ and conditional lexical connector drop-down menus 824c and 826c. In the example of FIG. 8c, the user has modified the main element 804c presented in GUI 800c to be the table items 820c. This user selections shown in FIG. 8c selects three conditional elements $806_{c1}$, $806_{c2}$, $806_{c3}$ to be table items 828c, 818c, and 830c and selects new conditional lexical connectors $308_1$ and $308_2$ to be 824c and 826c. This changed selection results in a new textual concatenation in panel 814c. These user modifications of the main element 302 and conditional element $806c_1$, $806c_2$, $806c_3$ results in the modified set $300_M$ of classified elements.

Figure 9:
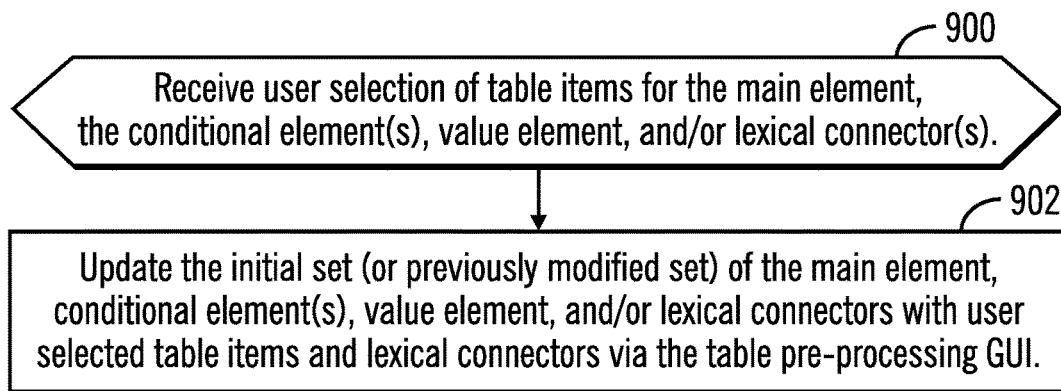
FIG. 9 illustrates an embodiment of operations to update the classification of elements in the table with user input.

FIG. 9 illustrates an embodiment of operations performed by the GUI generator 118 to form the modified set $300_M$ of element classifications and lexical connectors 300. The GUI generator 118 receives from the table pre-processing GUI 120 user modifications of the main element 302, conditional element(s) $306_1 \ldots 306_n$, value element 312, and/or new lexical connector(s) 304, 308i, 310. The GUI generator 118 then updates (at block 902) any of the main element 302, conditional element(s) $306_i$, value element 312, and/or lexical connectors 304, 308i, 310 in the initial set $300_I$ or a previously modified set $300_M$ with the user modifications to form a new modified set $300_M$ with the new values entered by the user via the GUI 120.

The embodiment of FIG. 9 allows a user, such as a subject matter expert, to modify the concatenation rules for the table 114 by updating the main element, conditional element(s), value element, and/or lexical connectors to provide a more optimized classification of the table items to improve subsequent NLP processing.

Figure 10:
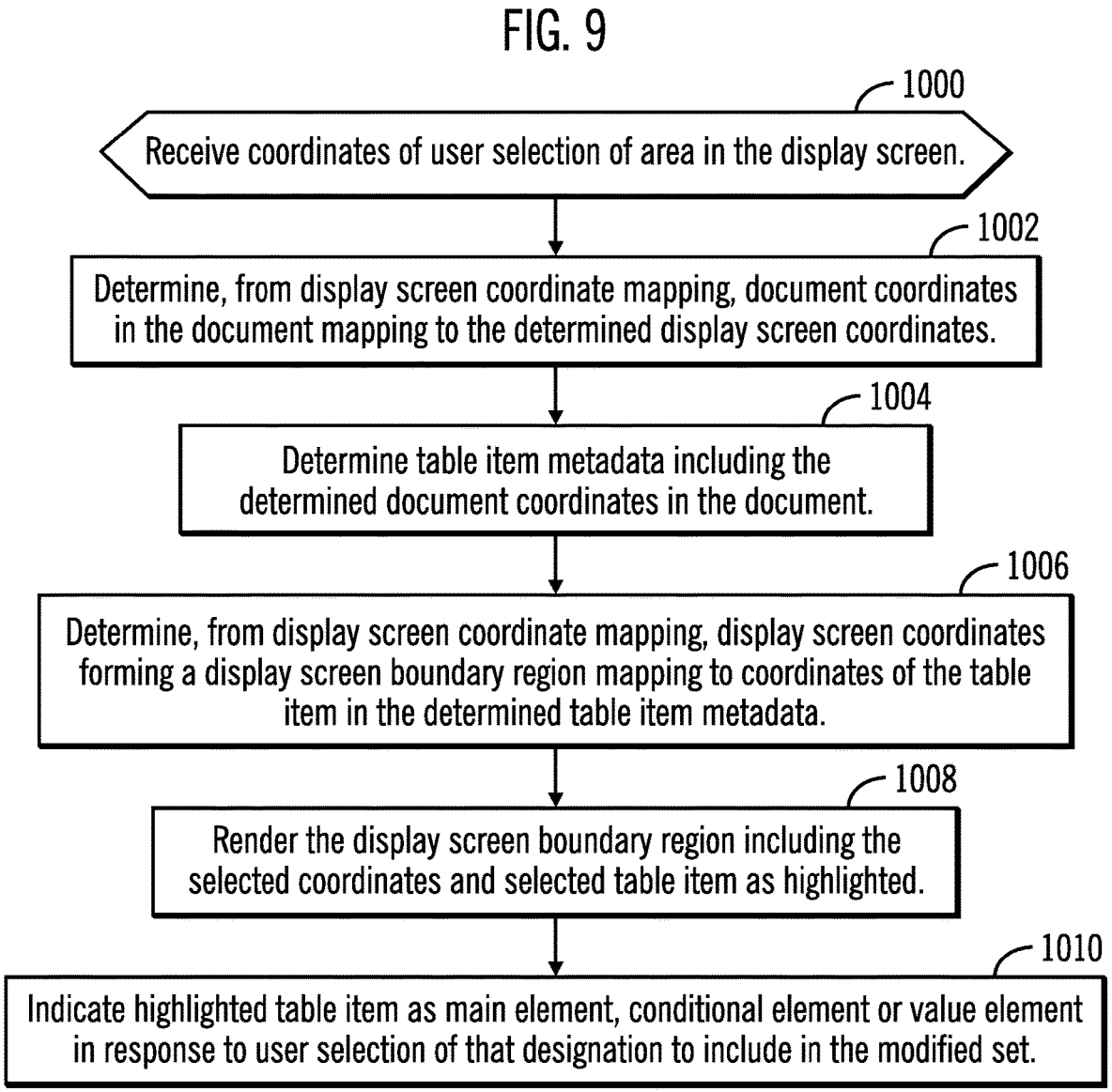
FIG. 10 illustrates an embodiment of operations to process user selection of a table item rendered on a display screen for table pre-processing.

FIG. 10 illustrates an embodiment of operations performed by the GUI generator 118 to process user selection of table items in the table 114 via the table pre-processing GUI 120. Upon receiving (at block 1000) coordinates of user selection of an area in the display screen in the table pre-processing GUI 120, the GUI generator 118 determines (at block 1002), from the display screen coordinate mapping 400i, document coordinates 404 in the document 112 mapping to the determined display screen coordinates 402. The table item metadata 200k is determined (at block 1004) that includes the determined document coordinates 404 in the document 112. The display coordinate mappings 400I are then used to determine display screen coordinates 402 forming a display screen boundary region that maps to the coordinates of the table item 208 in the determined table item metadata $200_i$. The GUI generator 118 renders (at block 1008) the display screen boundary region that includes the coordinates the user selected and the selected table item as highlighted. The GUI generator 118 may further update (at block 1010) the element classifications and lexical connectors 300i to indicate the highlighted table item as main element, conditional element or value element in response to user selection of that designation.

With the embodiment of FIG. 10, the GUI generator 118 translates, using geometrical calculations, a location of the user's click to document 112 coordinates, e.g., the page number and horizontal and vertical offsets within the document 112 of the user's click. The calculated document 112 coordinates (page number and offsets) of the user's click are used to look up the underlying table item by finding the extracted table item whose bounding box encloses the calculated offsets. In this way, the GUI generator 118 can locate any table element in the document 112 that the user clicks on, regardless of whether the text clicked on is (or is not) part of a value that was recognized and extracted from the document. Moreover, when the table item that the user clicks on contributed to a value recognized by the GUI generator 118 (be it a true positive or a false positive), the GUI generator 118 locates and renders the value recognized by the NLP engine 110 because all such values are linked to the extracted text elements that composed the flattened table item string that was sent to the NLP engine 110.\

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
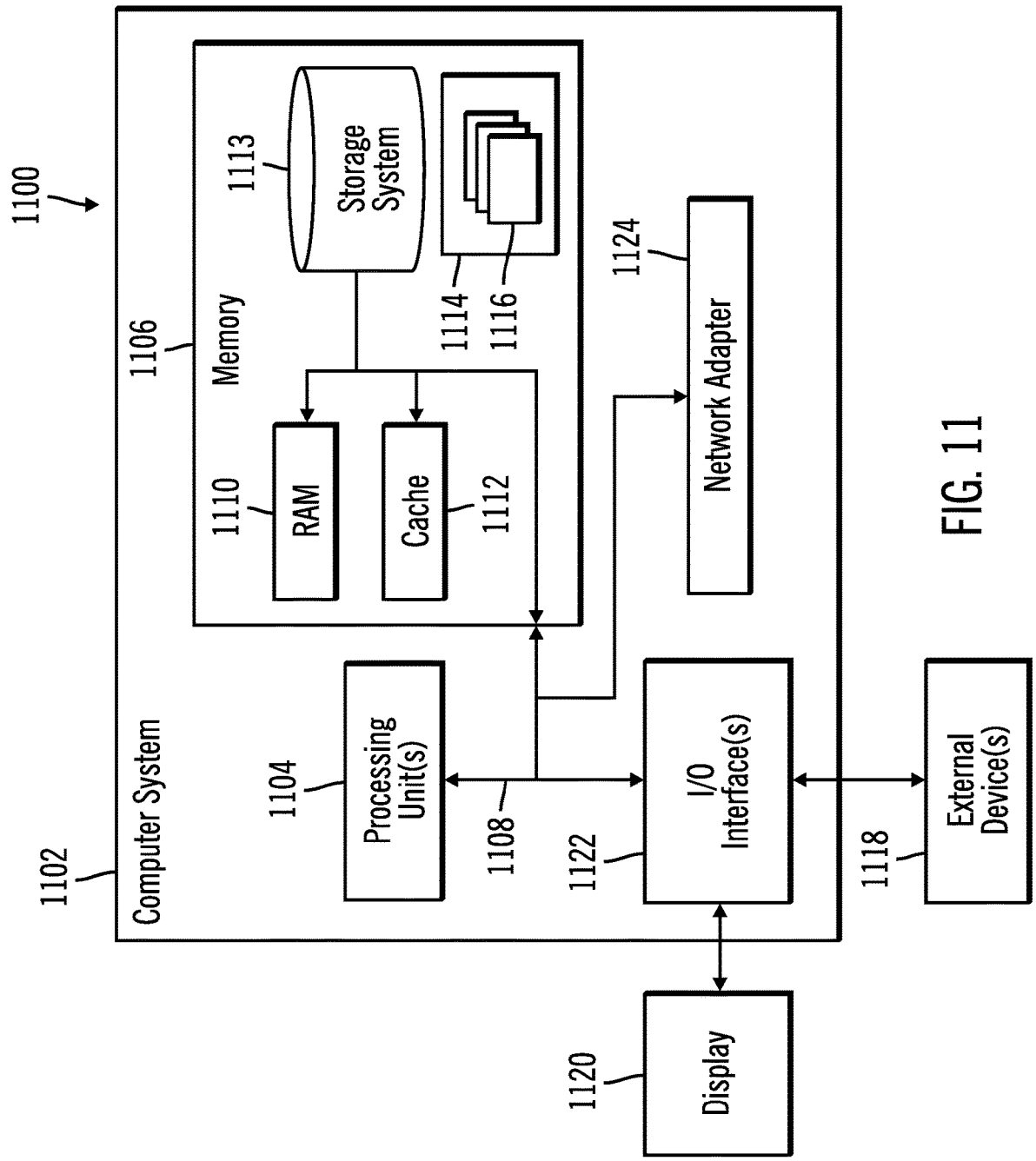
FIG. 11 depicts a computing environment in which the components of FIG. 1 may be implemented.

The computational components of FIG. 1, including the computer system 100, may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to, microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for natural language processing (NLP) of a document including a table, wherein the computer program product comprises a computer readable storage medium having computer readable program instructions executed by a processor to perform operations, the operations comprising:
    parsing a table in a document to extract column headers, row headers, and data cells;
    processing the column headers, row headers, and data cells to determine an initial set of a main element comprising an entity whose value is to be extracted, a conditional element that refines the entity, and a value element comprising a value for the entity from the processed column headers, row headers, and data cells;
    receiving a user selection of at least one of the column headers, row headers, and data cells for at least one of the main element, conditional element, and the value element in the initial set to produce a modified set of the main element, conditional element, and value element; and
    providing the modified set of the main element, conditional element, and the value element to an NLP engine to perform natural language processing of the document including the table, using the modified set of the main element, conditional element, and the value element to interpret the table.

2. The computer program product of claim 1, wherein the operations further comprise:
    generating a graphical user interface to render, on a display screen of a computer monitor, user graphical controls to enable the user selection of the main element, the conditional element, and the value element from the column headers, row headers, and data cells.

3. The computer program product of claim 2, wherein the graphical user interface includes an add graphical control to enable the user to add an additional conditional element and select one of the column headers, row headers, and data cells to be the additional conditional element to include in the modified set.

4. The computer program product of claim 2, wherein the operations further comprise:
    rendering, in the graphical user interface, first flattened text comprising a sentence constructed with the main element, the conditional element, and the value element in the initial set; and
    rendering, in the graphical user interface, second flattened text comprising a sentence constructed with the main element, the conditional element, and the value element in the modified set in response to receiving the user selection for at least one of the main element, the conditional element, and the value element.

5. The computer program product of claim 2, wherein the operations further comprise:
rendering, in the graphical user interface, the table with the column headers, the row headers, and the data cells;
highlighting in the table, rendered in the graphical user interface, the column headers, row headers, and data cells as the main element, conditional element, and the value element in the initial set; and
highlighting in the table, rendered in the graphical user interface, the column headers, row headers, and data cells comprising the main element, the conditional element, and the value element in the modified set in response to receiving the user selection.

6. The computer program product of claim 2, wherein the operations further comprise:
rendering, in the graphical user interface, a graphical selection control to enable the user to select lexical connectors to use between the main element and the conditional element and between the conditional element and the value element in the modified set; and
rendering, in the graphical user interface, flattened text comprising a sentence constructed with the main element, the conditional element, and the value element connected with the lexical connectors in the modified set.

7. The computer program product of claim 2, wherein the operations further comprise:
rendering, in the graphical user interface, table items of the table comprising the column headers, the row headers, and the data cells;
for each extracted table item comprising one of the extracted column headers, row headers, and data cells, saving coordinates of a region in the document including the extracted table item;
mapping display screen coordinates of the display screen in which the table is displayed to document coordinates in the document including table items;
determining document coordinates of table item boundaries in the table comprising the main element, conditional element, and the value element in one of the initial set and the modified set;
determining the display screen coordinates mapping to the determined document coordinates of the table item boundaries; and
highlighting the determined display screen coordinates mapping to the determined document coordinates of the table item boundaries to highlight the main element, the conditional element, and the value element.

8. The computer program product of claim 2, wherein the operations further comprise:
mapping display screen coordinates of the display screen in which the table is displayed to document coordinates in the document including table items comprising the column headers, the row headers, and the data cells;
in response to receiving the user selection, determining document coordinates mapping to user selected display screen coordinates;
determining a table item including the determined document coordinates;
determining display screen coordinates mapping to document coordinates of a table item boundary of the determined table item; and
highlighting the table item boundary on the display screen including the user selected display screen coordinates.

9. The computer program product of claim 8, wherein the operations further comprise:
receiving user selection of the table item highlighted on the display screen as one of the main element, conditional element, and value element to include in the modified set.

10. A system for natural language processing (NLP) of a document including a table, comprising:
a processor; and
a computer readable storage medium having computer readable program instructions executed by a processor to perform operations, the operations comprising:
parsing a table in a document to extract column headers, row headers, and data cells;
processing the column headers, row headers, and data cells to determine an initial set of a main element comprising an entity whose value is to be extracted, a conditional element that refines the entity, and a value element comprising a value for the entity from the processed column headers, row headers, and data cells;
receiving a user selection of at least one of the column headers, row headers, and data cells for at least one of the main element, conditional element, and the value element in the initial set to produce a modified set of the main element, conditional element, and value element; and
providing the modified set of the main element, conditional element, and the value element to an NLP engine to perform natural language processing of the document including the table, using the modified set of the main element, conditional element, and the value element to interpret the table.

11. The system of claim 10, wherein the operations further comprise:
generating a graphical user interface to render, on a display screen of a computer monitor, user graphical controls to enable the user selection of the main element, the conditional element, and the value element from the column headers, row headers, and data cells.

12. The system of claim 11, wherein the graphical user interface includes an add graphical control to enable the user to add an additional conditional element and select one of the column headers, row headers, and data cells to be the additional conditional element to include in the modified set.

13. The system of claim 11, wherein the operations further comprise:
rendering, in the graphical user interface, first flattened text comprising a sentence constructed with the main element, the conditional element, and the value element in the initial set; and
rendering, in the graphical user interface, second flattened text comprising a sentence constructed with the main element, the conditional element, and the value element in the modified set in response to receiving the user selection for at least one of the main element, the conditional element, and the value element.

14. The system of claim 11, wherein the operations further comprise:
rendering, in the graphical user interface, a graphical selection control to enable the user to select lexical connectors to use between the main element and the conditional element and between the conditional element and the value element in the modified set; and
rendering, in the graphical user interface, flattened text comprising a sentence constructed with the main element, the conditional element, and the value element connected with the lexical connectors in the modified set.

15. The system of claim 11, wherein the operations further comprise:
rendering, in the graphical user interface, table items of the table comprising the column headers, the row headers, and the data cells;
for each extracted table item comprising one of the extracted column headers, row headers, and data cells, saving coordinates of a region in the document including the extracted table item;
mapping display screen coordinates of the display screen in which the table is displayed to document coordinates in the document including table items;
determining document coordinates of table item boundaries in the table comprising the main element, conditional element, and the value element in one of the initial set and the modified set;
determining the display screen coordinates mapping to the determined document coordinates of the table item boundaries; and
highlighting the determined display screen coordinates mapping to the determined document coordinates of the table item boundaries to highlight the main element, the conditional element, and the value element.

16. A computer implemented method for natural language processing (NLP) of a document including a table, comprising:
parsing a table in a document to extract column headers, row headers, and data cells;
processing the column headers, row headers, and data cells to determine an initial set of a main element comprising an entity whose value is to be extracted, a conditional element that refines the entity, and a value element comprising a value for the entity from the processed column headers, row headers, and data cells;
receiving a user selection of at least one of the column headers, row headers, and data cells for at least one of the main element, conditional element, and the value element in the initial set to produce a modified set of the main element, conditional element, and value element; and
providing the modified set of the main element, conditional element, and the value element to an NLP engine to perform natural language processing of the document including the table, using the modified set of the main element, conditional element, and the value element to interpret the table.

17. The method of claim 16, further comprising:
generating a graphical user interface to render, on a display screen of a computer monitor, user graphical controls to enable the user selection of the main element, the conditional element, and the value element from the column headers, row headers, and data cells.

18. The method of claim 17, wherein the graphical user interface includes an add graphical control to enable the user to add an additional conditional element and select one of the column headers, row headers, and data cells to be the additional conditional element to include in the modified set.

19. The method of claim 17, further comprising:
rendering, in the graphical user interface, a graphical selection control to enable the user to select lexical connectors to use between the main element and the conditional element and between the conditional element and the value element in the modified set; and
rendering, in the graphical user interface, flattened text comprising a sentence constructed with the main element, the conditional element, and the value element connected with the lexical connectors in the modified set.

20. The method of claim 17, further comprising:
rendering, in the graphical user interface, table items of the table comprising the column headers, the row headers, and the data cells;
for each extracted table item comprising one of the extracted column headers, row headers, and data cells, saving coordinates of a region in the document including the extracted table item;
mapping display screen coordinates of the display screen in which the table is displayed to document coordinates in the document including table items;
determining document coordinates of table item boundaries in the table comprising the main element, conditional element, and the value element in one of the initial set and the modified set;
determining the display screen coordinates mapping to the determined document coordinates of the table item boundaries; and
highlighting the determined display screen coordinates mapping to the determined document coordinates of the table item boundaries to highlight the main element, the conditional element, and the value element.

* * * * *